(12) United States Patent
Huang

(10) Patent No.: US 12,736,078 B2
(45) Date of Patent: Sep. 15, 2026

(54) THREADED FASTENER

(71) Applicant: Wen-Pin Huang, Kaohsiung (TW)

(72) Inventor: Wen-Pin Huang, Kaohsiung (TW)

( * ) Notice: Subject to any disclaimer, the term of this patent is extended or adjusted under 35 U.S.C. 154(b) by 420 days.

(21) Appl. No.: 18/380,666

(22) Filed: Oct. 17, 2023

(65) Prior Publication Data

US 2024/0084839 A1 Mar. 14, 2024

(51) Int. Cl.
*F16B 19/10* (2006.01)
*F16B 33/02* (2006.01)
*F16B 19/05* (2006.01)

(52) U.S. Cl.
CPC .......... *F16B 33/02* (2013.01); *F16B 19/1045* (2013.01); *F16B 19/05* (2013.01)

(58) Field of Classification Search
CPC .............. F16B 19/1054; F16B 19/1063; F16B 19/1045; F16B 19/05
USPC ................................ 411/38, 34, 40–43, 361
See application file for complete search history.

(56) References Cited

U.S. PATENT DOCUMENTS 3,072,009 A * 1/1963 Stau .................... F16B 19/1054 29/283
3,139,786 A * 7/1964 Ardell ..................... F16B 19/05 411/361
3,421,562 A * 1/1969 Orloff ................... F16B 39/026 411/336
3,491,649 A * 1/1970 Smouton ............. F16B 19/1045 411/43
4,007,659 A * 2/1977 Stencel ............... F16B 19/1054 411/34
4,681,496 A * 7/1987 Fasolino ................ F16B 39/02 411/397
4,943,196 A * 7/1990 Dahl ....................... F16B 19/05 411/361
7,901,171 B2 * 3/2011 Schruff ................. F16B 37/067 411/38
8,430,613 B2 * 4/2013 Ohkubo .............. F16B 19/1054 411/360
10,087,969 B2 * 10/2018 Golan ................. F16B 19/1054
2010/0003105 A1 * 1/2010 Timmermann .......... B21K 1/60 470/12
2025/0215915 A1 * 7/2025 Yen ..................... F16B 19/1063

* cited by examiner

*Primary Examiner* — Flemming Saether

(57) ABSTRACT

A fastener includes a bolt including a head, a threaded shank having a bare section proximate the head, an intermediate grooved section, and an end section; and a hollow member including a head and a malleable shank having a plurality of holes through the shank. The grooved section includes a plurality of longitudinal grooves and a plurality of arcuate troughs between two of the adjacent grooves. The end section includes a plurality of projections arranged in a plurality of spaced, annular sets, and a plurality of cavities arranged in a plurality of spaced, annular sets. Each cavity is disposed between two of the adjacent projections. Each projection is disposed between two of the adjacent cavities.

1 Claim, 10 Drawing Sheets

THREADED FASTENER

BACKGROUND OF THE INVENTION

1. Field of the Invention

The invention relates to fasteners and more particularly to a threaded fastener having improved characteristics including an increased fastening force.

2. Description of Related Art

Referring to FIG. 1, a bolt 10' of a conventional threaded fastener is shown and referring to FIG. 2, an elongated, hollow member 11' of the conventional threaded fastener is shown. The bolt 10' comprises an enlarged head 100' and a threaded shank 101' having an intermediate bare section 102'.

However, the conventional threaded fastener is disadvantageous because the fastening force exerted on a work piece by the threaded fastener is not sufficient. It is typical that the work piece may be loosened.

Thus, the need for improvement still exists.

SUMMARY OF THE INVENTION

It is therefore one object of the invention to provide a fastener comprising a bolt including a head, a threaded shank having a bare section proximate the head, an intermediate grooved section, and an end section; and a hollow member including a head and a malleable shank having a plurality of holes through the shank; wherein the grooved section includes a plurality of longitudinal grooves and a plurality of arcuate troughs between two of the adjacent grooves; wherein the end section includes a plurality of projections arranged in a plurality of spaced, annular sets, and a plurality of cavities arranged in a plurality of spaced, annular sets; and wherein each the cavities are disposed between two of the adjacent projections and each the projections are disposed between two of the adjacent cavities.

Preferably, the grooves are spaced apart 90-degree each other.

The invention has the following advantages and benefits in comparison with the conventional art: a fastening force is increased. The manufacturing cost is decreased. Length of the bolt is decreased. A variety of work pieces having different thickness can be fastened.

The above and other objects, features and advantages of the invention will become apparent from the following detailed description taken with the accompanying drawings.

DETAILED DESCRIPTION OF THE INVENTION

Figure 1:
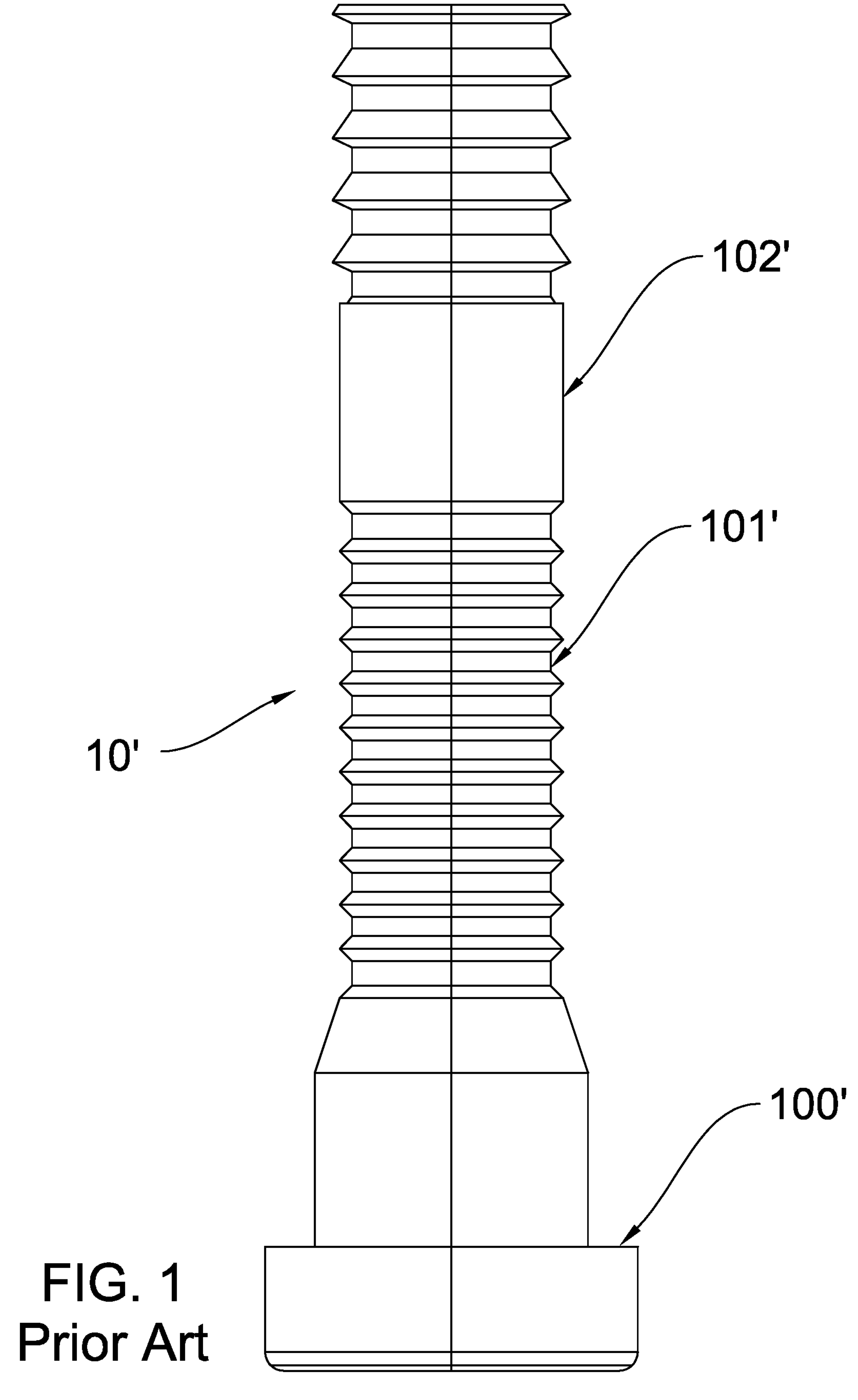
FIG. 1 is a side elevation of a bolt of a conventional threaded fastener.
Figure 2:
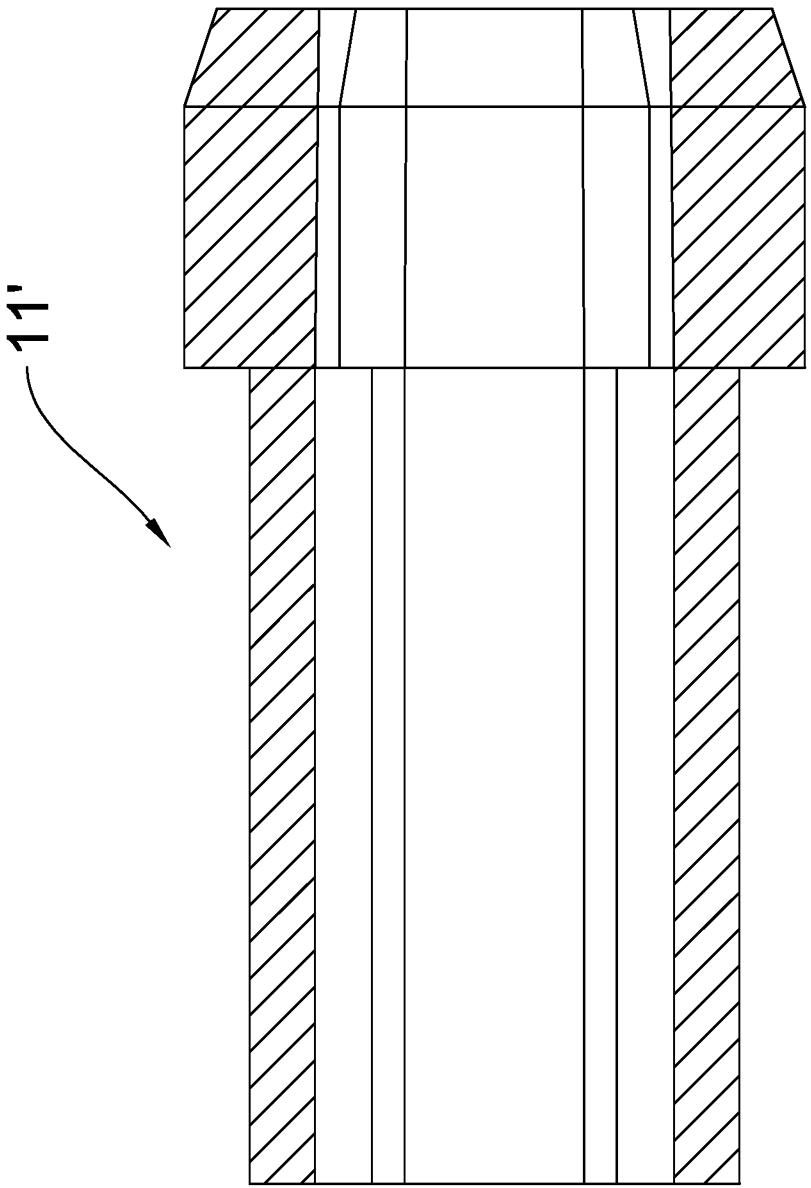
FIG. 2 is a sectional view of a hollow member of the conventional threaded fastener.
Figure 3:
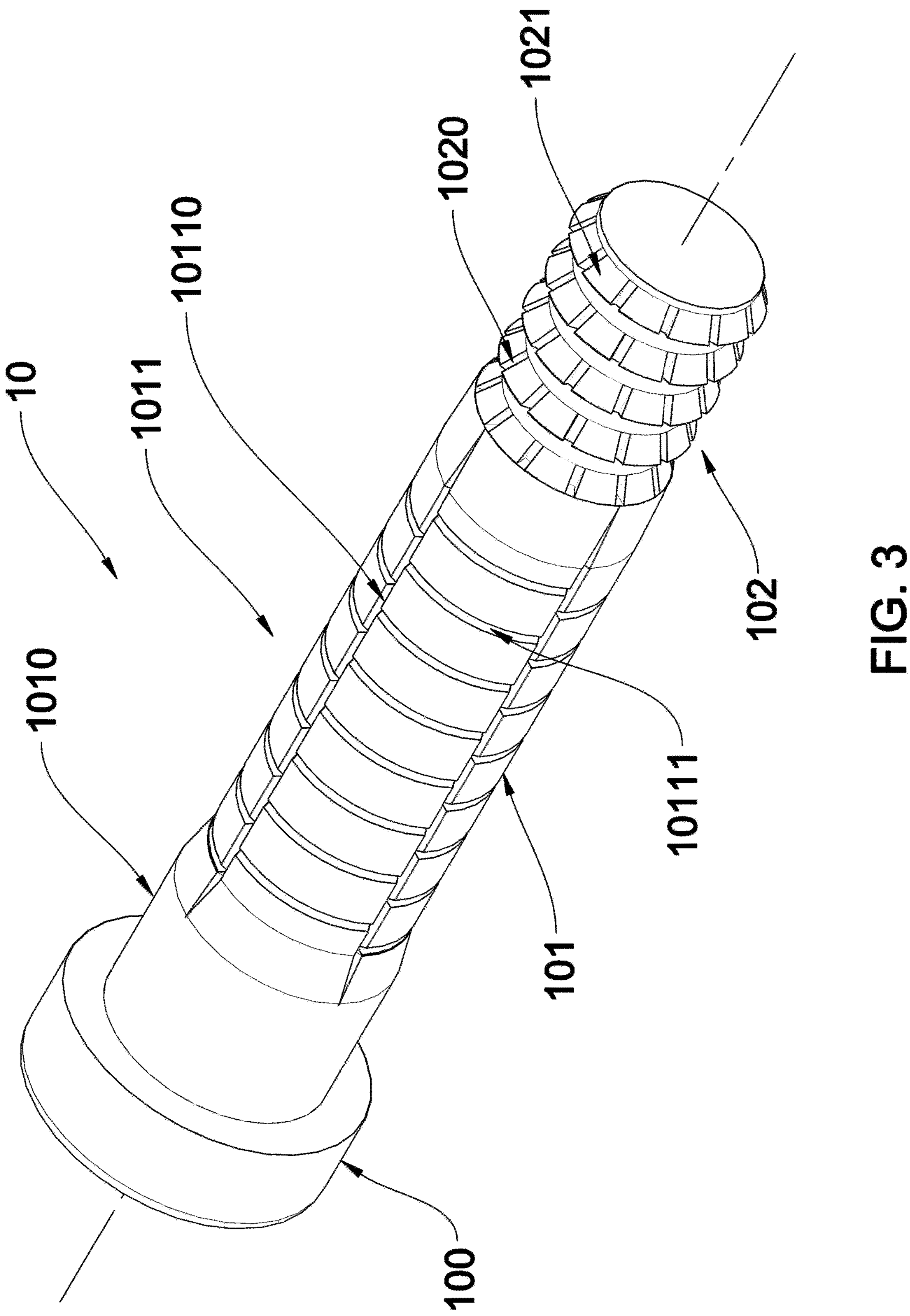
FIG. 3 is a perspective view of a bolt of a threaded fastener according to the invention.
Figure 4:
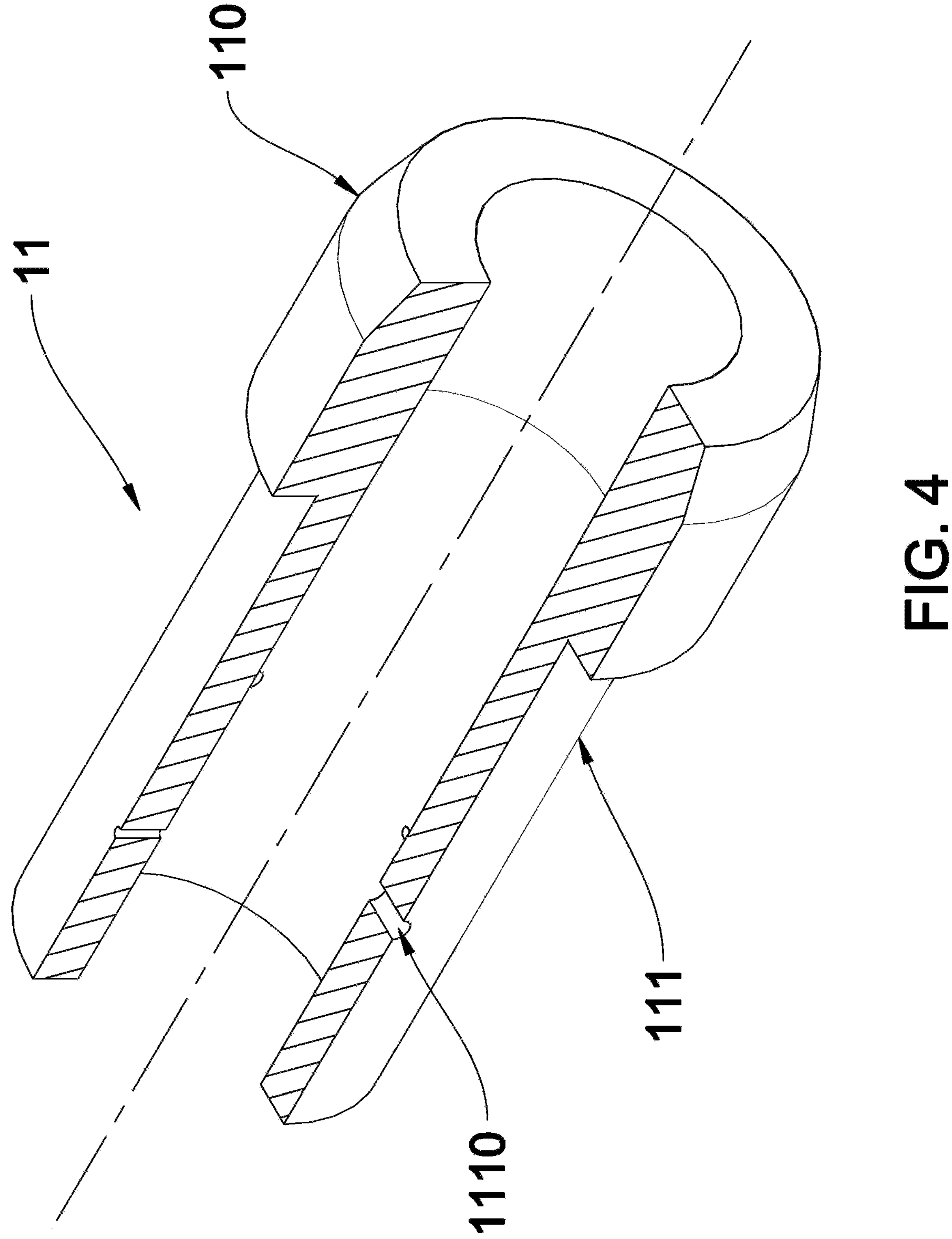
FIG. 4 is a partially broken away view of an elongated, hollow member of the threaded fastener according to the invention.
Figure 5:
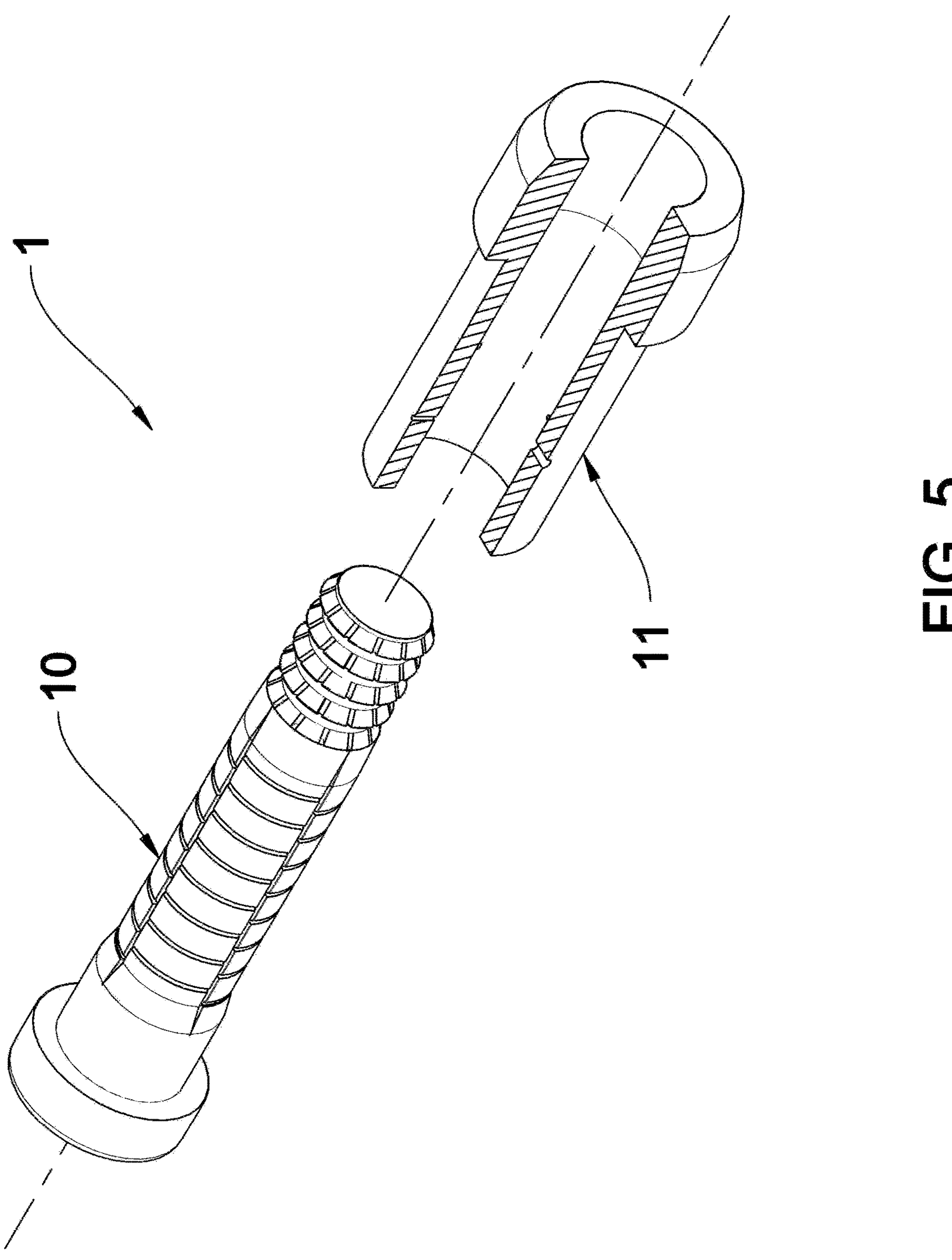
FIG. 5 is an exploded view of the threaded fastener according to the invention.
Figure 6:
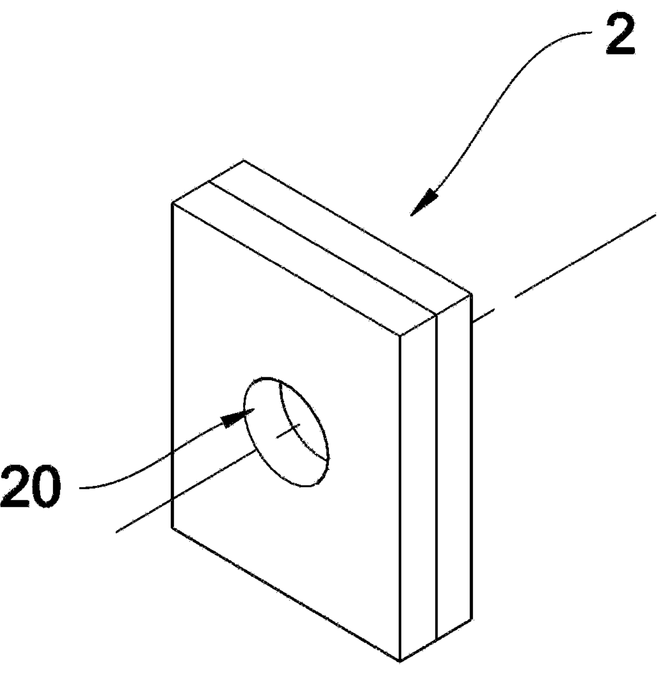
FIG. 6 is a perspective view of a work piece.
Figure 6A:
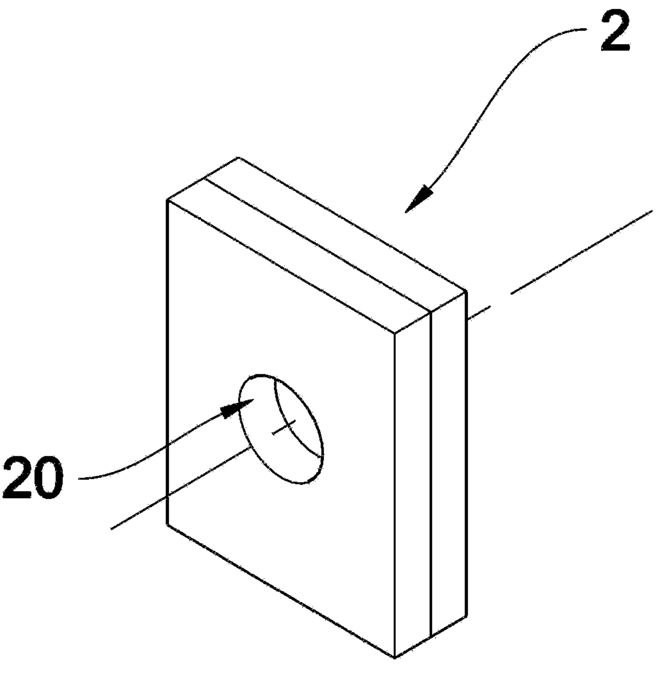
FIG. 6A is another perspective view of the work piece.
Figure 7:
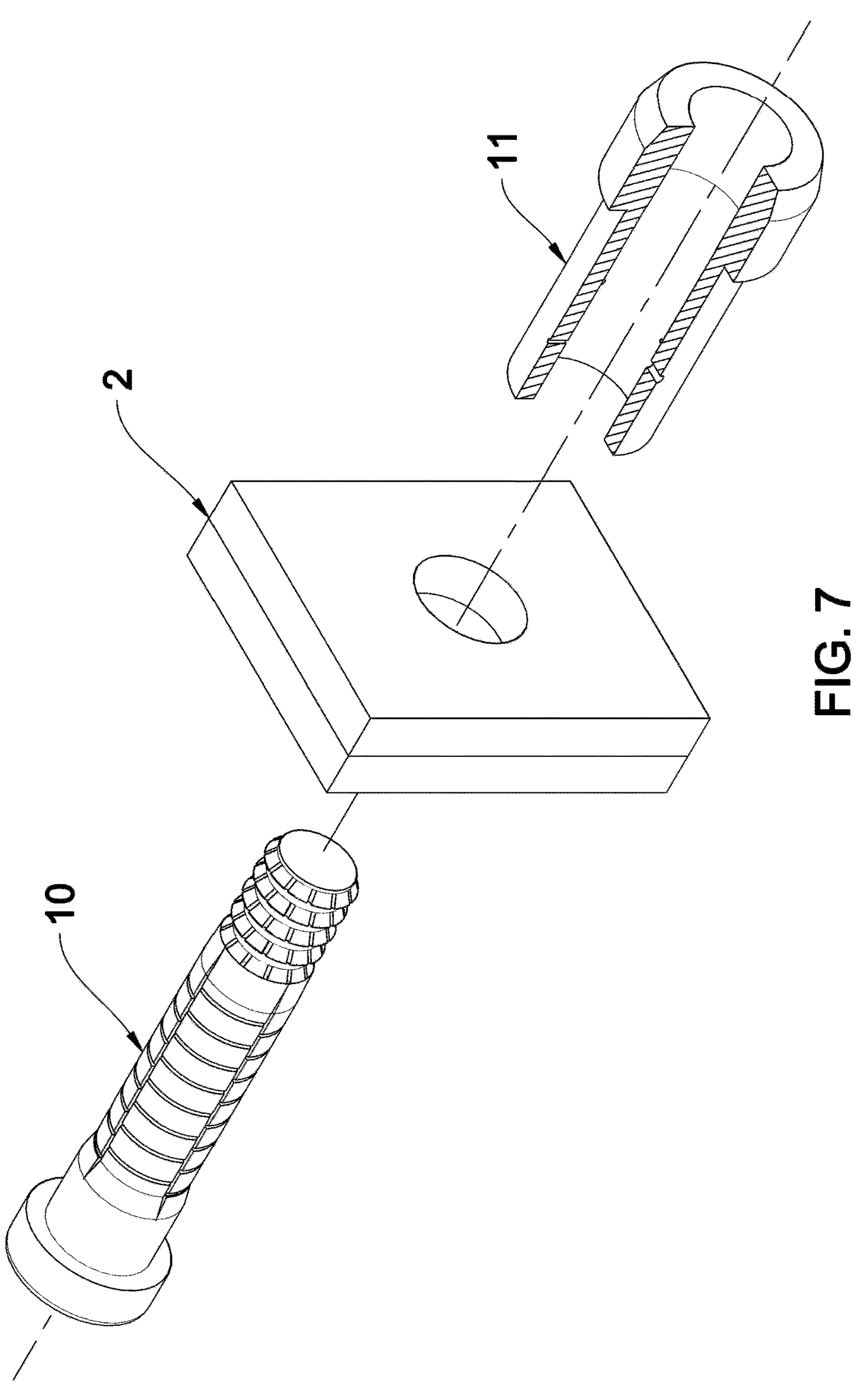
FIG. 7 shows the work piece to fastened by the bolt and the elongated, hollow member of the invention.
Figure 8:
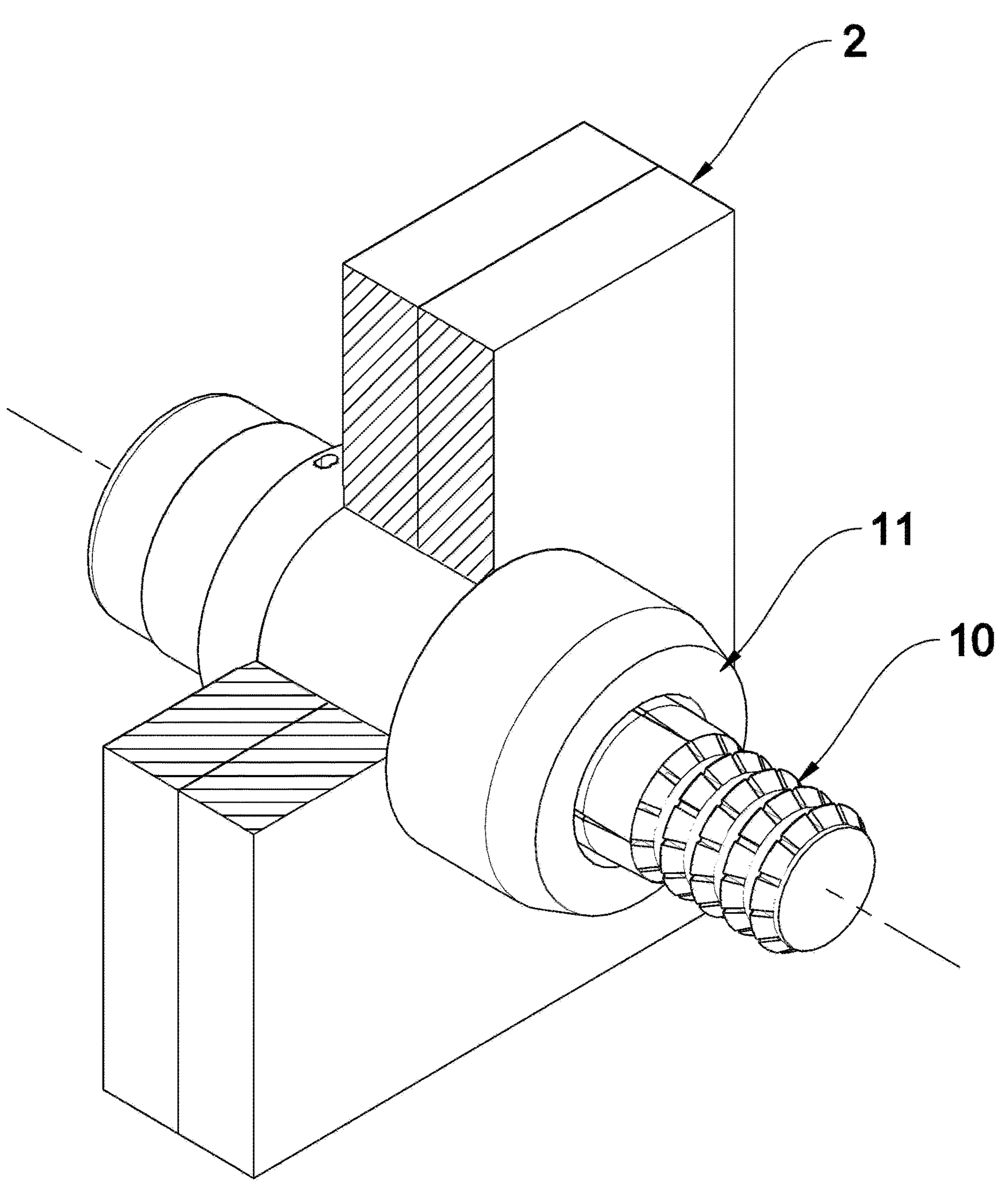
FIG. 8 is a partially broken away view showing the work piece in a step of being fastened by the bolt and the elongated, hollow member of the invention.
Figure 9:
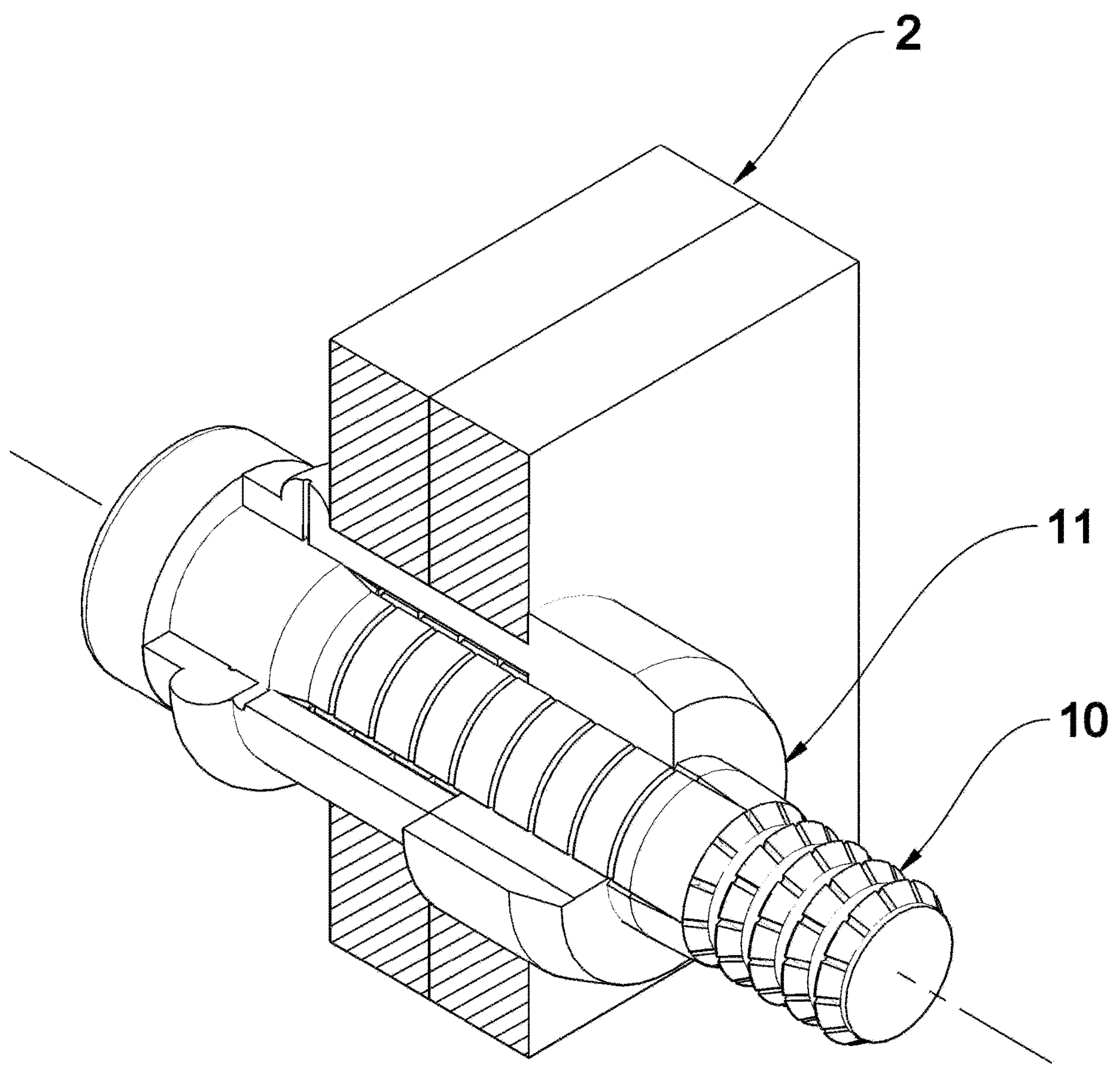
FIG. 9 is a view similar to FIG. 8 showing the malleable shank of the elongated, hollow member being pressed to fasten the work piece.
Figure 10:
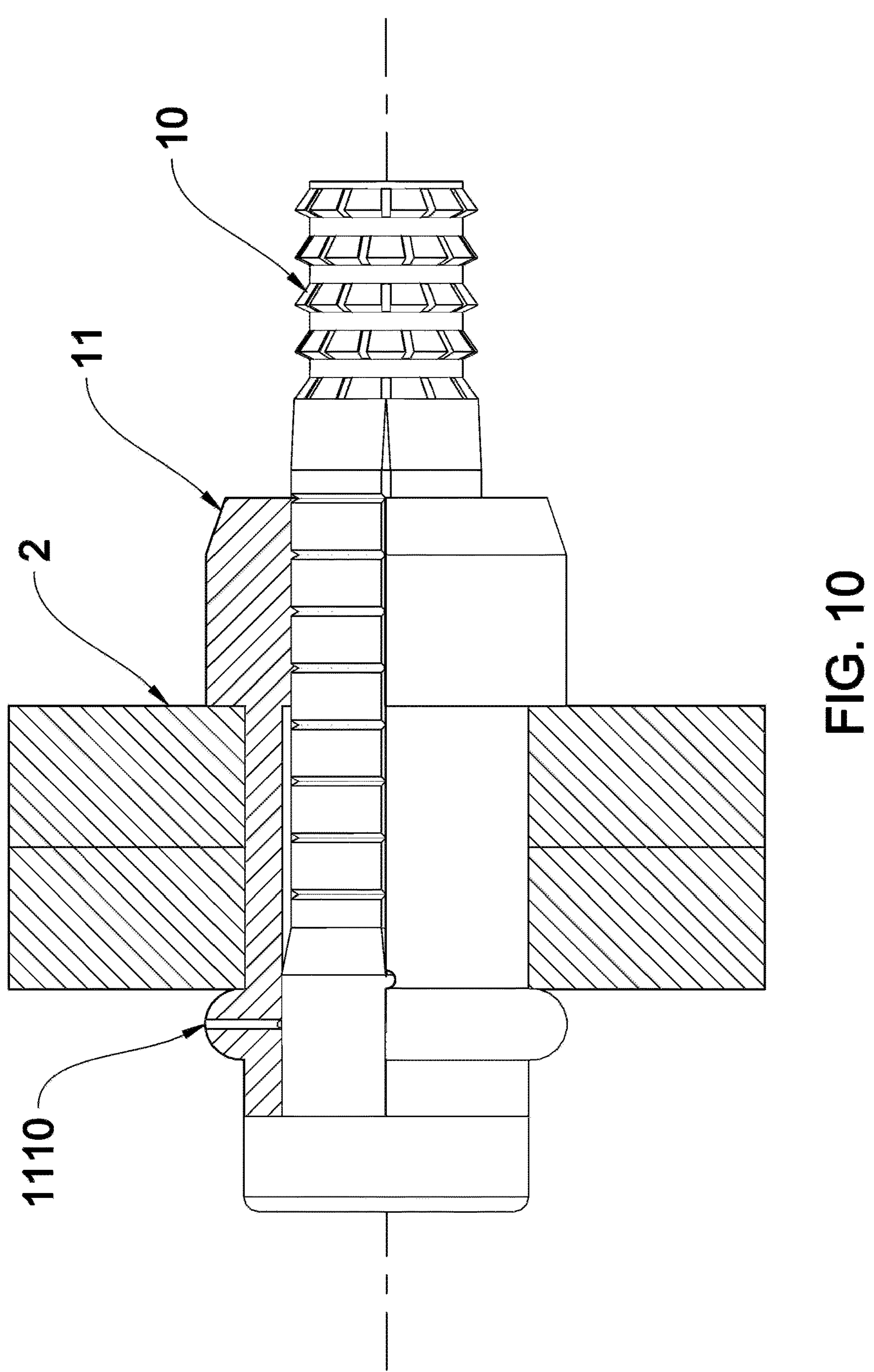
FIG. 10 is a side elevation in part section of the fastened work piece in FIG. 9.

Referring to FIGS. 1 to 10, a threaded fastener 1 in accordance with a first preferred embodiment of the invention comprises a bolt 10 including an enlarged head 100, a threaded shank 101 having a bare section 1010 proximate the head 100, an intermediate grooved section 1011, and an end section 102.

The grooved section 1011 includes a plurality of longitudinal grooves 10110 and a plurality of arcuate troughs 10111 between two of the adjacent grooves 10110. The grooves 10110 are spaced apart 90-degree each other.

The end section 102 includes a plurality of projections 1020 arranged in a plurality of spaced, annular sets, and a plurality of cavities 1021 arranged in a plurality of spaced, annular sets in which the cavity 1021 is disposed between two of the adjacent projections 1020 and the projection 1020 is disposed between two of the adjacent cavities 1021.

The threaded fastener 1 further comprises an elongated, hollow member 11 including an enlarged head 110 and a malleable shank 111 having a plurality of holes 1110 through the shank 111.

This arrangement can increase a fastening force, decrease length, and decrease manufacturing cost of the threaded fastener 1.

In a fastening step (see FIGS. 7 to 10), the elongated, hollow member 11 is inserted through a hole 20 of a work piece 2 until the head 110 contacts a front surface of the work piece 2. Next, the bolt 10 is inserted through the elongated, hollow member 11 to press the malleable shank 111. An inner surface of the elongated, hollow member 11 is urged against by the grooved section 1011. A portion of the malleable shank 111 adjacent the holes 1110 is raised to urge against a rear surface of the work piece 2. As a result, the work piece 2 is fastened by the threaded fastener 1. It is noted that the provision of the holes 1110 facilitates the malleability of the shank 11.

The invention has the following advantages and benefits in comparison with the conventional art: length of the bolt 10 is decreased. A variety of work pieces 2 having different thickness can be fastened.

While the invention has been described in terms of preferred embodiments, those skilled in the art will recognize that the invention can be practiced with modifications within the spirit and scope of the appended claims.

What is claimed is:

1. A fastener, comprising:

a bolt including a head, a shank having a bare section proximate the) head, an intermediate grooved section, and an end section;

wherein the grooved section includes a plurality of longitudinal grooves and a plurality of arcuate troughs between two of the adjacent grooves;

wherein the end section includes a plurality of projections arranged in a plurality of spaced, annular sets, and a plurality of cavities arranged in a plurality of spaced, annular sets; and wherein each of the cavities are disposed between two of the adjacent projections and each of the projections are disposed between two of the adjacent cavities.

* * * * *